US009146662B2

(12) United States Patent
Lederer

(10) Patent No.: US 9,146,662 B2
(45) Date of Patent: Sep. 29, 2015

(54) METHOD FOR CONTROLLING AN IMAGE ON A DISPLAY

(75) Inventor: Thomas Lederer, Herrsching (DE)

(73) Assignee: Unify GmbH & Co. KG, Munich (DE)

( * ) Notice: Subject to any disclaimer, the term of this patent is extended or adjusted under 35 U.S.C. 154(b) by 224 days.

(21) Appl. No.: 13/876,947

(22) PCT Filed: Mar. 12, 2012

(86) PCT No.: PCT/EP2012/001622
§ 371 (c)(1),
(2), (4) Date: Mar. 29, 2013

(87) PCT Pub. No.: WO2013/152782
PCT Pub. Date: Oct. 17, 2013

(65) Prior Publication Data
US 2015/0020007 A1    Jan. 15, 2015

(51) Int. Cl.
*G06F 3/0481* (2013.01)
*G06F 3/0482* (2013.01)
*G06F 3/0484* (2013.01)
*G06F 3/0488* (2013.01)
*G06T 3/00* (2006.01)

(52) U.S. Cl.
CPC .......... *G06F 3/04845* (2013.01); *G06F 3/0484* (2013.01); *G06F 3/0488* (2013.01); *G06F 3/04883* (2013.01); *G06F 3/04886* (2013.01); *G06T 3/00* (2013.01); *G06F 2203/04808* (2013.01)

(58) Field of Classification Search
None
See application file for complete search history.

(56) References Cited

U.S. PATENT DOCUMENTS 6,690,387 B2 *   2/2004   Zimmerman et al. ........ 345/684
6,707,449 B2 *   3/2004   Hinckley et al. ............. 345/173
(Continued)

OTHER PUBLICATIONS

International Preliminary Report on Patentability for PCT/EP2012/001622 dated Oct. 23, 2014 (Form PCT/ISA/373) (English Translation).
(Continued)

*Primary Examiner* — Matt Kim
*Assistant Examiner* — Mahelet Shiberou
(74) *Attorney, Agent, or Firm* — Buchanan Ingersoll & Rooney PC

(57) ABSTRACT

We provide methods for influencing the presentation of image information displayed on a display device of a piece of information technology equipment using a transformation of an image including performing a first transformation according to a control motion performed by the user; and triggering a transformation; providing a field on the display device such that the field at the conclusion of the control motion remains activatable for at least a defined or definable period, and performing an additional transformation that is identical to the first transformation each time the field is activated by the user.
The invention furthermore relates to a corresponding piece of information technology equipment.

19 Claims, 5 Drawing Sheets

(56) References Cited

U.S. PATENT DOCUMENTS

| | | | |
|---|---|---|---|
| 8,904,306 B1* | 12/2014 | Whitney et al. | 715/786 |
| 2004/0080528 A1* | 4/2004 | Rand et al. | 345/738 |
| 2008/0055273 A1* | 3/2008 | Forstall | 345/173 |
| 2009/0090567 A1 | 4/2009 | Tonouchi | |
| 2009/0237421 A1* | 9/2009 | Kim et al. | 345/661 |
| 2009/0282370 A1 | 11/2009 | Rainwater et al. | |
| 2010/0123734 A1 | 5/2010 | Ozawa et al. | |
| 2011/0061025 A1* | 3/2011 | Walline et al. | 715/830 |
| 2012/0210214 A1* | 8/2012 | Yoo et al. | 715/702 |
| 2013/0016122 A1* | 1/2013 | Bhatt et al. | 345/620 |
| 2013/0290116 A1* | 10/2013 | Hepworth et al. | 705/14.73 |
| 2014/0223381 A1* | 8/2014 | Huang et al. | 715/863 |

OTHER PUBLICATIONS

Written Opinion of the International Searching Authority for PCT/EP2011/001622 dated Dec. 20, 2012 (Form PCT/ISA/237) (German Translation).

International Preliminary Report on Patentability for PCT/EP2011/001622 dated Dec. 20, 2012 (Forms PCT/IB/373, PCT/ISA/237) (German Translation).

* cited by examiner

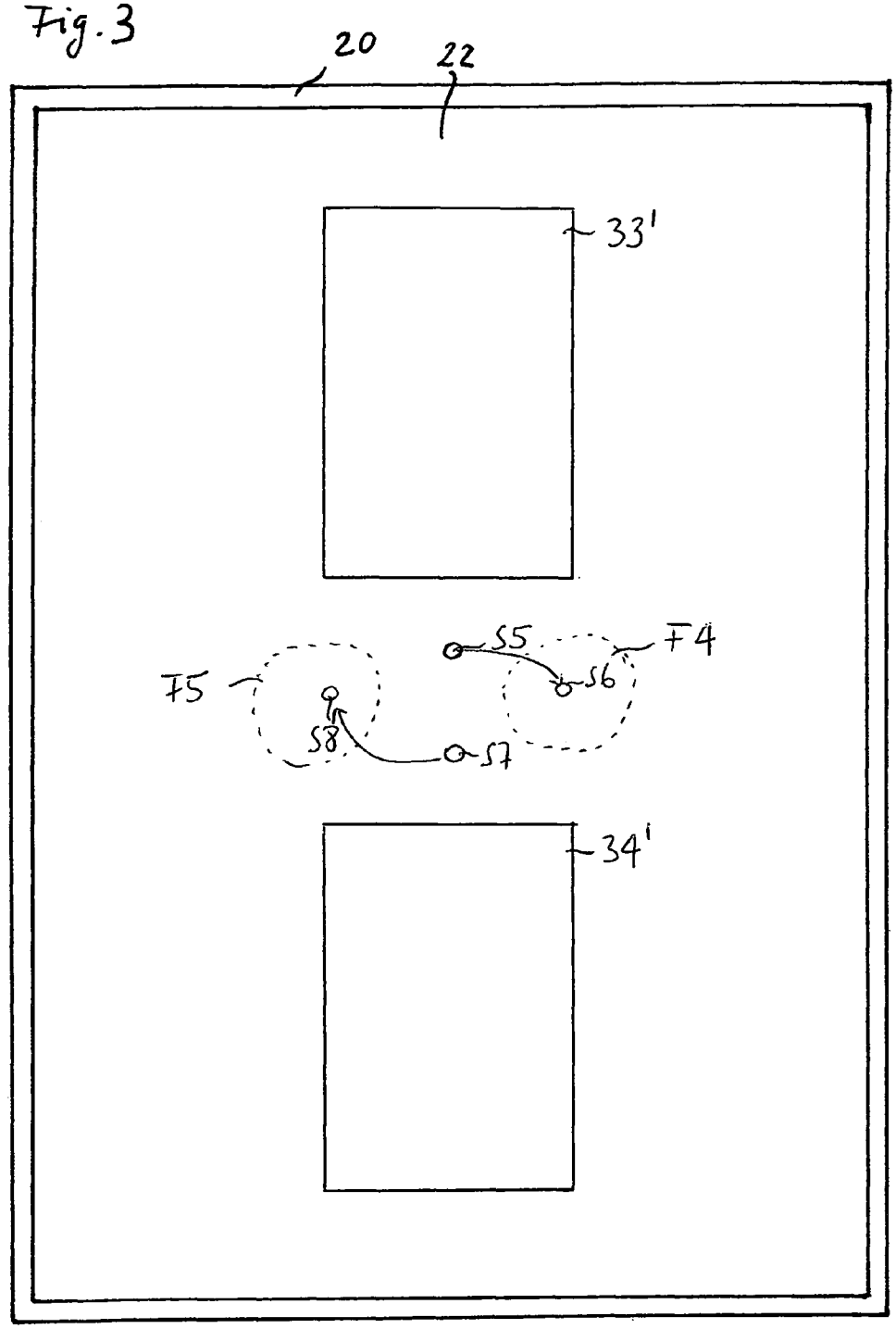

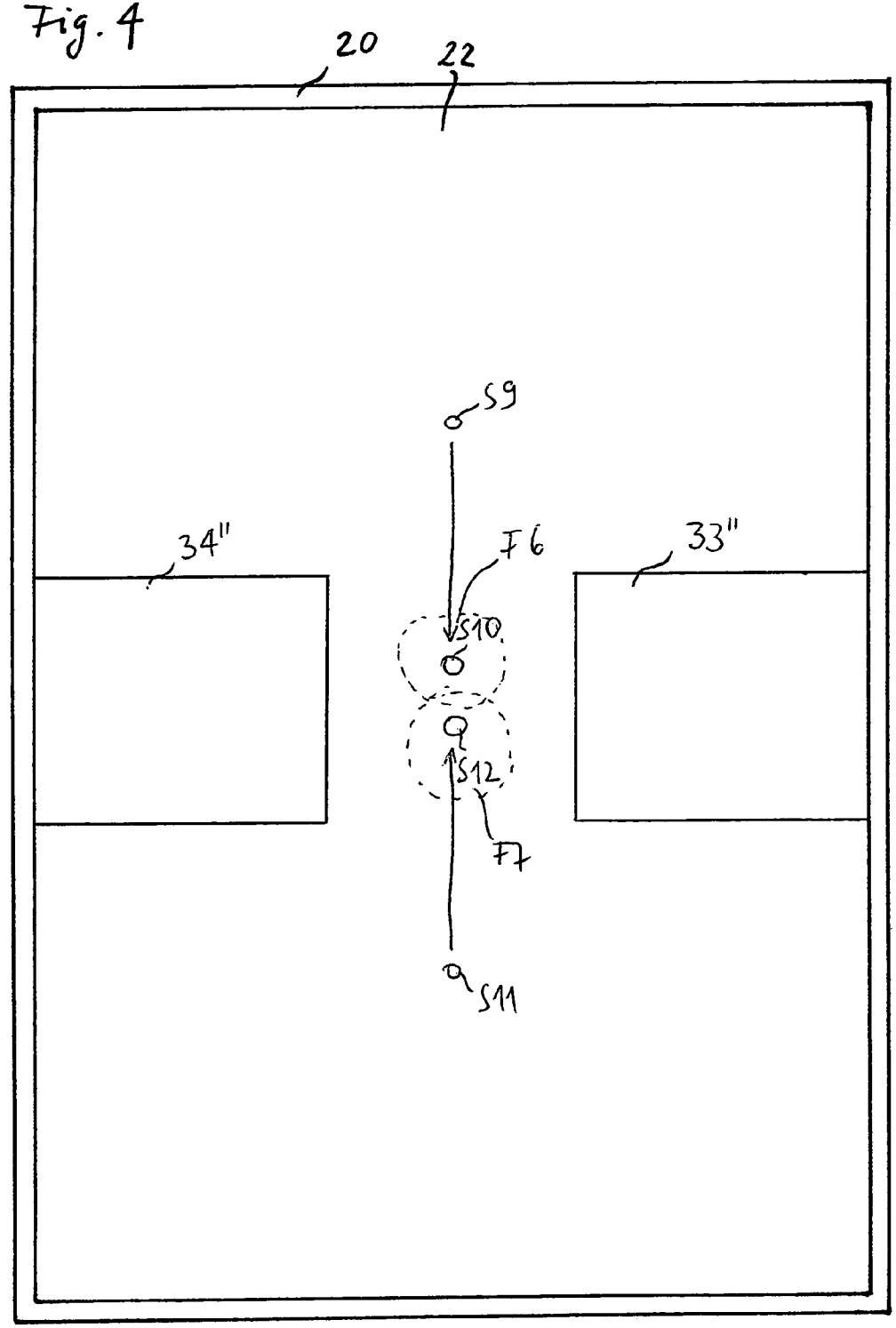

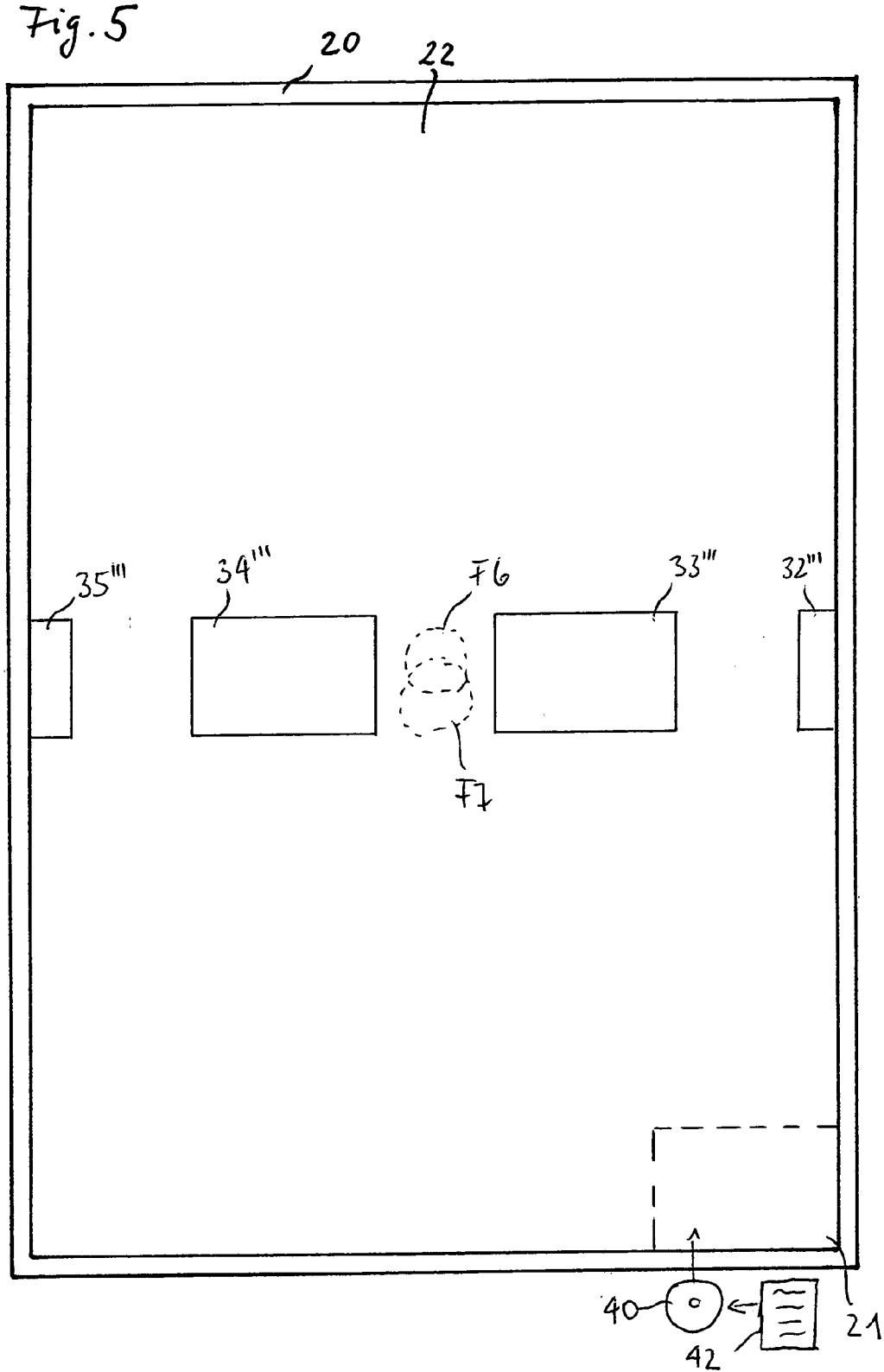

METHOD FOR CONTROLLING AN IMAGE ON A DISPLAY

CROSS-REFERENCE TO RELATED APPLICATIONS

This application is the United States National Phase of PCT International Patent Application No. PCT/EP2012/001622, filed Apr. 12, 2012.

BACKGROUND OF THE INVENTION

1. Field of the Invention

Embodiments relate to methods for influencing the presentation of image information displayed on a display device of a piece of information technology equipment. Embodiments may also relate to a computer program product for a respective control device of a piece of information technology equipment that executes these methods, a data carrier with a computer program product stored on it and a piece of information technology equipment with a control device that is designed for the execution of the aforementioned methods. Finally, embodiments relate to the use of a control device for controlling the display device of a piece of information technology equipment.

2. Background of the Related Art

Information technology equipment in terms of the present invention includes, for example, desktop computers, laptops or notebooks as well as mobile phones, in particular so-called Smartphones, tablet computers, MP3 players, portable video or DVD players, etc. Increasingly, such information technology equipment, referred to in short as IT equipment below, features a so-called touchscreen, that is, a display device that is touch-sensitive and can therefore be used by a user for controlling the display device. Increasingly so-called swipe motions or swipe gestures are used and serve as control motions. Such swipe gestures are, for example, vertical scrolling through lists or horizontal scrolling between different views in an image gallery, for example. The swipe gestures are often motions of the hand or finger of the user of such equipment. Since such equipment has only display devices of a limited size, it is not easy to guarantee the precision of such swipe gestures. Thus, each swipe gesture performed allows only for a certain amount of scrolling in order to achieve a certain minimum precision level for the procedure. Then scrolling must begin anew by interrupting or ending the swipe gesture and returning the respective finger to the starting point to repeat the swipe gesture.

Thus, to carry out several swipe gestures, a relatively long path must be covered by the finger that executes the swipe gesture with a big portion of the covered path being useless because it only serves to return the finger to the starting point of the swipe gesture. Such long paths also increase the time required to perform such swipe gestures.

It is further known to take the speed of the swipe gestures into account in order to accelerate scrolling in longer lists. However, this decreases the accuracy of the scrolling process because stopping it cannot be influenced directly.

It is also known to provide a separate scrollbar as an alternative for scrolling. However, the disadvantage of this is that space is lost for the actual objective, namely the presentation of information, due to the obviously limited area on the display device.

BRIEF SUMMARY OF THE INVENTION

It is, therefore, the objective of the present invention to improve this situation by reducing the required time and increasing simplicity, accuracy and speed of handling when controlling the presentation of the information displayed on the display device of a piece of IT equipment.

Thus, the basic concept is to liberate the user of a display device from the necessity of having to perform the control motion anew when repeating an executed transformation and from having to carry out a return motion beforehand, and instead to provide the user with the ability of executing any number of repeats of the executed first transformation simply by activating a field provided on the display device. This procedure is simple and intuitive. Furthermore, the speed can be increased significantly when influencing the presentation of the information presented on the display device.

LIST OF REFERENCE NUMBERS

Figure 1:
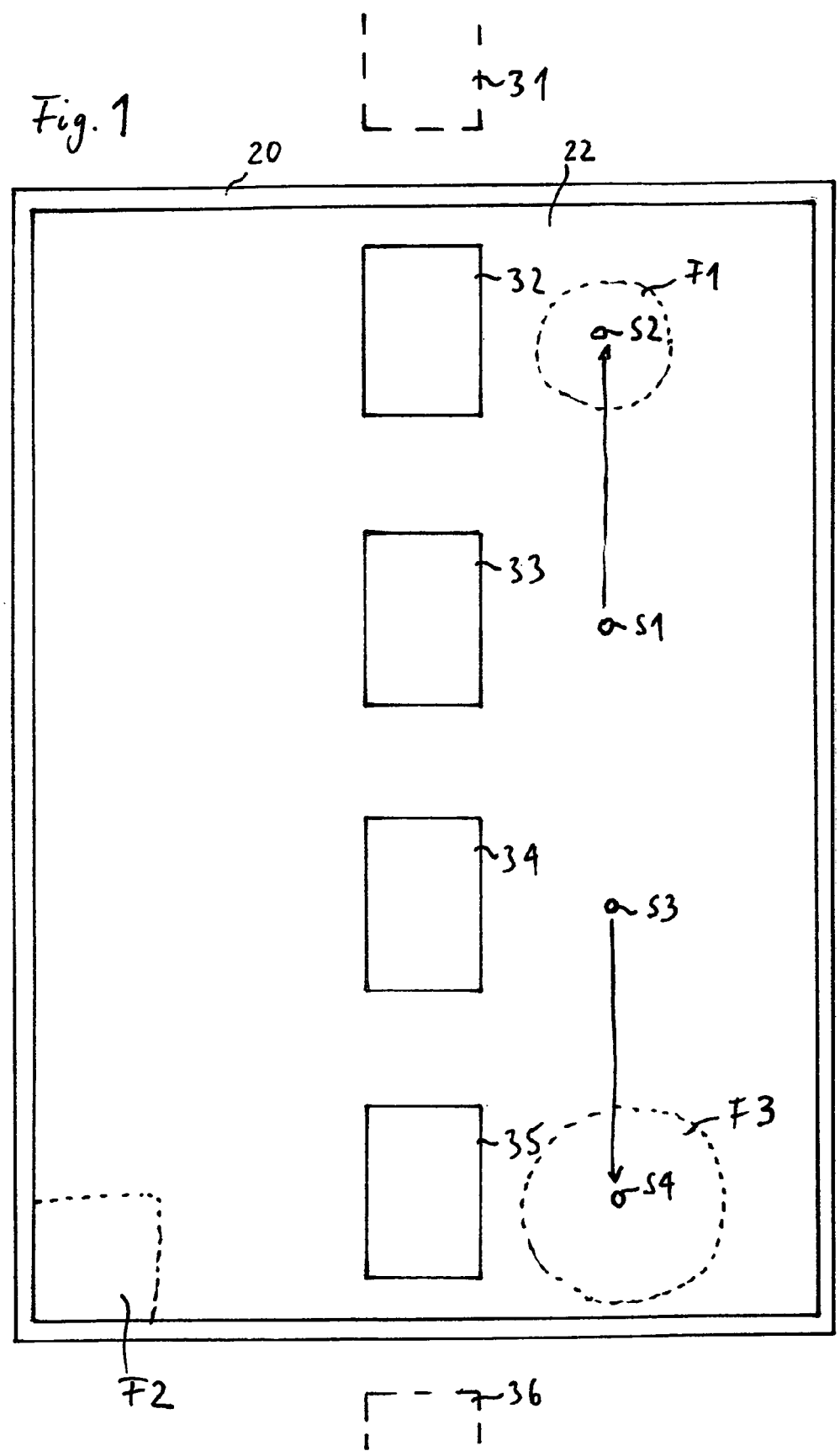
FIG. 1 A top view of a display device, for example a Smartphone, in a first display situation, FIG. 2 A presentation of the display device similar to FIG. 1 in a second display situation, FIG. 3 A presentation of the display device similar to FIG. 1 in a third display situation, FIG. 4 A presentation of the display device similar to FIG. 1 in a fourth display situation, FIG. 5 A presentation of the display device similar to FIG. 1 in a fifth display situation.

20=Piece of information technology equipment
21=Control device/chip
22=Display device/touchscreen
31-37=Image/image information
40=Computer program
42=Data carrier
F1-F7=Field
S1-S12=Spot

DETAILED DESCRIPTION OF THE INVENTION

The term "display device" refers to a display device in its most general form for displaying image information. Such display devices are also referred to as screens or displays and can be manufactured using various technologies, for example using LCDs, LEDs or OLEDs. Such display devices are in particular touch-sensitive and thus designed as so-called touchscreens such that a user can use such a display device also as an input device by touching or pressing on the display device with a stylus, a finger or even several fingers on at least one position or by sliding the finger or the stylus across the display device, which is also referred to as a swiping gesture.

The term "image information" refers to presented information of any kind, which can be displayed for a user in the form of a typically two-dimensional image. However, such information can also be displayed as 3D-information or pseudo-3D-information. Such information may be comprised of images, graphics, but also text or the like, and as a rule consists of a matrix of image dots. Image information in this context also refers to vector graphics and all information that can be presented or displayed on today's display devices.

"Influencing the presentation of image information" refers to a change of the presentation through a transformation of the image information as desired by the user. According to the invented method, such transformations may be, but are not limited to, transpositions or scrolls, rotations or turns, compressions (i.e., reductions) and expansions (i.e., magnifications) of the image information. To perform such a transformation, a user carries out a control motion that triggers or initiates the transformation.

The image information displayed on a display device of the information technology equipment initially experiences a first transformation of the image information depending on the control motion performed by the user in order to carry out this transformation. The method according to the invention implemented using a processor or computer is characterized by the fact that, during or after stopping the control motion, a field is provided on the display device for at least a defined or definable period, where said field remains activatable or can be activated. Then the first transformation can be repeated as often as the user activates the field. Activation can be performed in various manners: on a touchscreen, it can be done by simple tapping using a finger or a respective stylus; on a regular computer display, it can also be done by a mouse click, for example. Executing an additional transformation that is identical to the first transformation thus constitutes a repeat of the previously executed transformation. It goes without saying that the field remains activatable or can be activated during the entire period even after a repeated transformation. In other words, the field designates a location or a region or an area on a display device.

According to one advantageous embodiment of the invention, the field is formed precisely in that region of the display device, where the control motion of the user stops. The advantage of this is that the user can activate the field without additional motion of a finger or a mouse pointer parallel to the surface of the display device. This means that the user only needs to touch the field using, for example, a finger, a stylus or a mouse pointer in order to activate it. This assumes that if the control motion is executed using a finger or a stylus, the control motion is concluded by lifting the finger or the stylus off the display device, while in the case of using a mouse pointer (in particular with the left button held down) for executing the control motion, clicking the location where the mouse pointer is situated, after releasing the left mouse button at the target of the control motion, can be used to activate the field. For example, after navigating on a map with the left mouse button held down, a renewed execution of the transformation can be effected by clicking the field at the end of the navigation motion. The end of the control or navigation motion can also be assumed, for example, when its speed falls below a certain value that is either specified or set.

As an alternative, it is, of course, also possible to form or provide the field, for example, in one of the corners of the display device, such that a user can repeat the transformation executed by the control motion independent of the type or the precise end of the prior control motion as many times as desired by accepting a one-time motion to the field in the corner in order to then repeat the transformation by a simple tap without an additional motion parallel to the display device. It shall be noted that the location where the field is provided can be varied as desired or can be selected as desired during the implementation of the present invention.

It may be advantageous if the field is invisible for the user such that he is not distracted or irritated by the field, which can be visible only briefly, if necessary.

It may be advantageous if the activatable field can be activated only during a limited time and is then deactivated or removed. This can prevent a user from repeating an earlier executed transformation at a later point in time by unintentionally tapping the field. For example, it can be specified that the activatable field is deactivated automatically after a specified time has expired following its activation. For example, after the end of the control motion, and thus after its activation, the activatable field can remain active for one second and then lose its activatability automatically.

So that a user can adapt it to his habits, it can be advantageous if he can set the period during which the field can be activated. This provides great freedom for a user to determine by himself how he would like to control or influence a display device by using the method according to the invention.

A particularly interesting case of applying the present invention is provided when using IT equipment with a touch-sensitive screen—also referred to as a touchscreen. On such a touchscreen, the control motions are carried out as swiping motions or swiping gestures, for example by using a finger and/or a thumb or also by using a pointer device. Through sequential or repeated tapping on the field, the user can perform a high number of repetitions of the initially executed transformation in a simple and intuitive manner without having to perform the respective control motion as well.

It is advantageous in the above cases if lifting the finger or thumb or the pointing device that performs the control motion off the touchscreen is used as the conclusion of the control motion and thus as the initiation of the step for providing the activatable field. This procedure corresponds advantageously to the "natural" motion of a touchscreen user. Thus, this method can be considered ergonomic.

If the control motion is performed as a multi-finger swiping motion using at least two fingers, or a thumb and at least one finger, it is advantageous for the user if, at the conclusion of the control motion, an activatable field for performing the subsequent transformation is formed at every area of the display device, where a component of the control motion performed using a finger or thumb is concluded. Here, "component of the control motion" shall be understood such that, if a rotation of the image information on the display device has been performed through a rotational motion of the thumb and index finger, for example, an activatable field is provided at both the end location of the finger's motion and the end location of the thumb's motion. Tapping on one of these fields will then repeat the transformation executed before. This reduces the effort required of the user to repeat the execution of the transformation. Of course, according to the invention it can also be provided or set by the user that a repeated execution of the transformation occurs only if both fields are activated after the conclusion of the control motion.

An additional option for avoiding an unintentional repetition of an already executed transformation by tapping an activatable field may be that each activatable field is also deactivated through tapping an area on the display device outside the field. This offers the additional advantage that different types of transformations can be executed in succession in the traditional fashion without this being influenced by the invention-related provision of a field for creating the possibility of a simplified repetition of the prior executed transformation; it goes without saying that the only "constraint" for the execution of the traditional method is that the transformation that is to be executed following the first transformation cannot be started by tapping an area that is located in one or more of the provided fields.

One problem addressed by embodiments of the invention is also solved by a computer program product or by a computer program that controls a control device of information technology equipment in order to execute a method according to the present invention. In addition, a problem addressed by embodiments of the invention can also be solved using a data carrier on which an aforementioned computer program product is stored and can be used to execute this computer program.

Furthermore, a problem addressed by embodiments of the invention is solved by using information technology equipment that includes a display device and a control device that is provided to control the display device and is equipped such that it can control the display device pursuant to the method according to the invention. A particularly advantageous embodiment of such information technology equipment is characterized in that the display device has a touchscreen.

The use of a control device for controlling the display device of a piece of information technology equipment pursuant to a method according to the invention is also considered a part of the present invention.

The advantages, features and particularities of the various versions of the method according to the invention also apply in analogous fashion to the computer program product, the data carrier, the information technology equipment, and the use of the control device pursuant to the present invention without the need to have this described again.

Embodiments can also be employed very well for a display device that can be controlled using optical recognition of control motions. Such optical recognition can be carried out, for example, by using a camera that senses control or swiping motions and transfers them to the control device. Such cameras can sense head or eye motions, for example, which can also be used to control the display device.

The invention is described in greater detail below, based on advantageous embodiments with reference to the drawing.

The description of advantageous embodiments of the invention below assumes that, according to FIG. 1, the information technology equipment 20 is a Smartphone with a touchscreen serving as the display device 22 that can be influenced using the finger (and possibly the thumb) of a user. Of course, specially designed styluses or other objects can be used instead of fingers. Alternatively, it is also possible that the display device 22 is a "regular" monitor - for example of a notebook or desktop computer—where the presentation can be influenced by a mouse pointer using a held-down left or right mouse button.

Below, directional information such as "left," "right," "up," and "down" refers to spatial orientation with regard to the presentation in the figures in the drawing plane and shall not constitute any restrictions. If images are presented in portrait format, it means that their lengthwise side expands from top to bottom, while the lengthwise side of images presented in landscape format expands from left to right. Of course, there is no difference between "from left to right" and "from right to left" as well as "from top to bottom" and from "bottom to top", etc. in the aforementioned directions of expansion. In addition, it is assumed that the term "image height" refers to the direction from top to bottom while "image width" refers to the direction from left to right.

In FIG. 1, four images 32 to 35, presented only schematically, are shown above each other on the touchscreen 22 in portrait format as examples of image information. Of course, graphics, texts or other information that is shown on the touchscreen can take the place of the images. An image 31, indicated with dashed lines, is shown above the top image 32 and outside the touchscreen 22, while an image 36, also outside the touchscreen 22 and indicated with dashed lines, is shown underneath the bottom image 35. As should be clear intuitively, images 31 and 36 will be presented on the touchscreen 22 only after upward or downward scrolling or transposition of the display.

A spot S1 is shown as a point to the right of image 33, and a spot S3 is shown as a point to the right of image 34. Spot S3 is essentially shown as a point in the same manner as all other spots S2 and S4 to S12 mentioned below, without this being expressly specified each time. These spots S1 to S12 are used only to explain the present invention and are not actually displayed on the touchscreen 22; instead they designate examples of locations where the user touches the touchscreen 22 or concludes the touch, as shall be explained in detail below. The respective arrows that symbolize the swiping motions between the different spots and have no specific designation are also not shown on the touchscreen 22.

Figure 2:
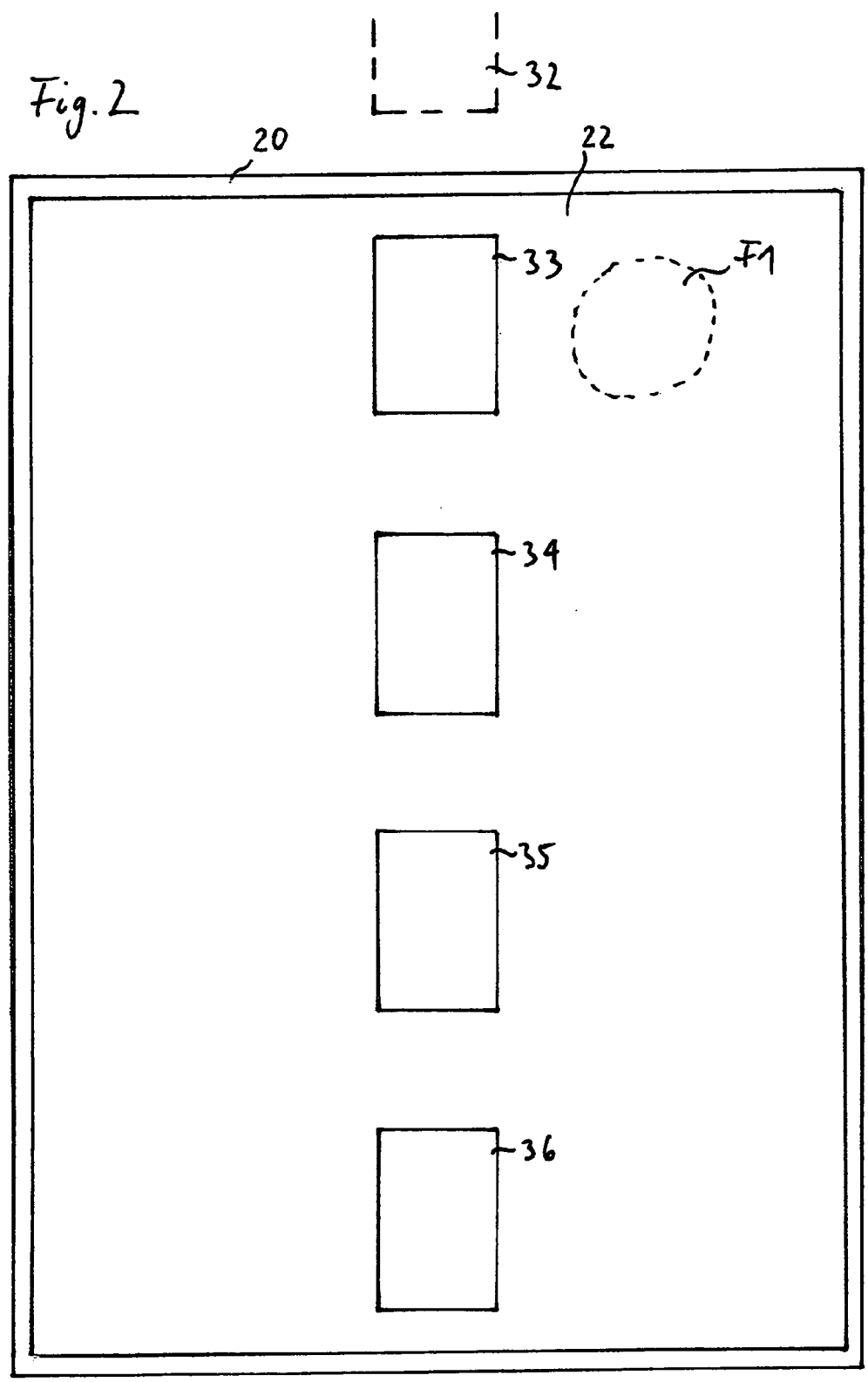

When a user touches the touchscreen 22 at spot S1 with the finger and drags the finger to spot S2, the image content is scrolled upward such that the display situation shown in FIG. 2 arises, in which from top to bottom the images 33 to 36 are shown in the same locations where images 32 to 35 were visible in FIG. 1. Image 32 shown in dashed lines above image 33 is thus no longer visible in FIG. 2. As soon as the user lifts his finger off the touchscreen 22 at spot S2, a field F1 is formed or provided at spot S2. Because the field F1 is not necessarily visible on the touchscreen 22, it is indicated in dashed fashion only. In this embodiment, field F1 has an approximately circular design. As soon as the user taps field F1, also shown in FIG. 2, the scrolling or transposing process described above will be executed again and the images 34 to 37 will be shown from top to bottom on the touchscreen, which is, however, not shown in a separate figure. It is clear that the procedure of tapping the field F1 just described above can be repeated as many times as desired and that it influences a transposition process each time, if the image information to be shown allows such.

As an alternative to the field F1 shown in FIG. 1 and provided at spot S2, where the swiping gesture for upward scrolling was concluded, a field F2 may also be formed at the bottom left corner of the touchscreen 22, for example in the form of a square or a rectangle. This can provide the user with the advantage that, after each change in position of his fingers or his hand, he does not need to contemplate where the last swiping gesture may have ended in order to execute a repeat of the transformation caused by the swiping gesture by tapping this spot.

If, on the other hand, according to FIG. 1 a user places the finger on the touchscreen 22 at spot S3 and drags it down to spot S4, the images 31 to 34 will be visible from top to bottom on the touchscreen. After concluding the swiping gesture and lifting the finger off the touchscreen 22 at spot S4, a field F3 is formed at spot S4, which, according to this example, also has a circular design but is larger than the field F1 described above. Size and shape of the respective fields, as well as the period during which they can be activated and thus remain useable, are either preset in the equipment or can be set by the user.

However, if on the basis of FIG. 1 the user performs a so-called two-finger gesture by placing one finger and the thumb on spots 51 and S3 on the touchscreen 22 and dragging them apart such that they end at spots S2 and S4, a magnification of the display is effected on the touchscreen 22. One example of this is shown in FIG. 3, where the magnified images 33' and 34' are now shown on the touchscreen 22. If now, based on FIG. 3, an additional two-finger gesture is performed by using the thumb and, for example, the index finger in such a manner that they are placed on the touchscreen 22 at spots S5 and S7 and are each rotated by about 90° to the right, such that they end at spots S6 and S8, the image content will be rotated 90°. The display situation after the 90° rotation is shown in FIG. 4. According to the presentation in FIG. 4, the two images 34" and 33" are now shown in landscape format. Fields F4 and F5 are now provided at spots S6 and S8, respectively, when lifting off the thumb and the index finger at the conclusion of this swiping gesture. According to one embodiment, as soon as one of the two spots F4 and F5 is touched, the 90° rotation executed before will be repeated and afterwards the two images 33' and 34' will be "upside down"; this is, however, not shown in the drawing.

Of course, it can also be configured so that a new 90° rotation can occur only if not just one but both of the fields F4 and F5 are touched and thus activated.

Based on FIG. 4, the user can also perform an additional two-finger gesture, for example, by grabbing the two spots S9 and S11 on the touchscreen 22, which are relatively far apart, with the thumb and the index finger and then guiding thumb and index finger vertically toward each other to spots S10 and S12, respectively, in order to shrink the display. At the end of this swiping gesture, two fields F6 and F7 are formed at spots S10 and S12, which overlap in this example. This display situation is shown in FIG. 5, where the two images 33' and 34''' are fully visible and the images 35''' and 32''' are partially visible, and where additionally the fields F6 and F7 resulting from the swiping gesture of FIG. 4 are shown as well. By tapping these fields or one of these fields, the user can effect an additional reduction of the presentation. Alternatively, the user can—as is known—perform a horizontal swiping gesture to shrink the presentation, which is identical to the vertical swiping gesture.

Finally, a control device 21 is indicated schematically in FIG. 5 at the bottom right corner, which is typically a processor or a chip and is designed to control the display device, preferably the entire piece of information technology equipment. A computer program or a computer program product 40 is used to control the control device 21 and is stored on a data carrier shown in exemplary fashion as a CD-ROM 42 and can be read into the control device 21 via a suitable interface or an appropriate reading device.

Although this has not been stated specifically, it is clear that the aforementioned swiping gestures can be repeated as often as desired by simple tapping of the respective field(s). This allows for very simple and effective yet precise and at the same time fast control or influencing of the information presented on the touchscreen 22.

It should be noted that the features of the invention described by referencing the presented embodiments, for example shape, design or arrangement of the field(s) as well as the respective activation and deactivation and the activation period, can be present in other embodiments as well unless stated otherwise or prohibited for technical reasons.

The invention claimed is:

1. A method for influencing presentation of image information displayed on a display device of a piece of information technology equipment involving a transformation of the image information as desired by a user, comprising:
   performing a first transformation of the image information in response to a control motion performed to trigger the first transformation, the first transformation comprising at least one type of transformation comprising at least one of transposition, rotation, compression, and expansion of the image information;
   providing a field on the display device such that the field remains activatable at the conclusion of the control motion that triggered the first transformation for at least a defined or definable time period, and
   performing an additional second transformation of the image information that is an identical type of transformation to the type of transformation of the first transformation each time the field is activated by the user within the defined or definable time period, the field being activatable by selection of the field within the defined or definable time period after the conclusion of the performed control motion without repeating the control motion.

2. The method of claim 1, further comprising forming the field in that area of the display device where the control motion was concluded.

3. The method of claim 1, wherein the field is not visible to the user.

4. The method of claim 1, further comprising automatically deactivating the activatable field after expiration of a defined time period after activation.

5. The method of claim 1, wherein, the time period during which the field remains activatable after conclusion of the control motion is settable.

6. The method of claim 1, wherein, a touchscreen is used as the display device and a user performs a swiping motion as the control motion using at least one of a finger, a thumb, and a pointer device.

7. The method of claim 6, wherein lifting one of the finger, the thumb, and pointer device that is performing the control motion off the touchscreen concludes the control motion.

8. The method of claim 6, wherein a multi-finger swiping motion is performed as the control motion using at least two fingers or a thumb and at least one finger, and, at the conclusion of the control motion, an activatable field for performing the subsequent transformation is formed at every area of the display device where a component of the control motion performed using a finger or thumb is concluded.

9. The method of claim 1, wherein, each activatable field is deactivated by tapping an area of the display device outside of the field.

10. A non-transitory computer program product comprising a computer program for a control device stored on a non-transitory piece of information technology equipment that, when executed, performs a method according to claim 1.

11. A piece of information technology equipment comprising,
   a display device, and
   a control device, the control device being configured to control the display device according to the method of claim 1.

12. The piece of information technology equipment of claim 11, wherein said display device comprises a touchscreen.

13. The method of claim 1, wherein the type of transformation of the first transformation comprises one of rotation, compression, and expansion of the image information and the type of transformation of each second transformation is the type of the first transformation.

14. The method of claim 13, comprising:
   performing the control motion, the control motion being a gesture made by at least one finger moving along a touchscreen of the display device.

15. The method of claim 14, comprising:
   selecting the field within the defined or definable time period after the conclusion of the performed control motion without performing the gesture.

16. The method of claim 15, wherein lifting the at least one finger away from the touchscreen occurs after the gesture is concluded and the field is provided on the touchscreen in response to detection of the at least one finger being lifted away from the touchscreen.

17. The method of claim 16, comprising:
   deactivating the field after the defined or definable time period has passed without a selection of the field occurring.

18. The method of claim 17, wherein the field is positioned on the display adjacent to at least one corner of the touchscreen.

19. The method of claim 17, wherein the field is positioned at an area of the display device where a finger that performed the gesture was located at a conclusion of the gesture before that finger was lifted away from the touchscreen.

\* \* \* \* \*